US008998556B2

(12) United States Patent
Learned

(10) Patent No.: US 8,998,556 B2
(45) Date of Patent: Apr. 7, 2015

(54) LOAD-N-GO PLATFORM LIFT SYSTEMS

(76) Inventor: James Learned, Utica, NY (US)

( * ) Notice: Subject to any disclaimer, the term of this patent is extended or adjusted under 35 U.S.C. 154(b) by 515 days.

(21) Appl. No.: 13/337,079

(22) Filed: Dec. 24, 2011

(65) Prior Publication Data

US 2012/0189422 A1 Jul. 26, 2012

Related U.S. Application Data

(60) Provisional application No. 61/435,506, filed on Jan. 24, 2011.

(51) Int. Cl.
*B60P 1/64* (2006.01)
(52) U.S. Cl.
CPC .................................... *B60P 1/6445* (2013.01)
(58) Field of Classification Search
CPC ........ B60P 1/6427; B60P 1/6463; B60P 7/13; B60P 1/6418; B65D 90/14
USPC .......................................................... 414/498
See application file for complete search history.

(56) References Cited

U.S. PATENT DOCUMENTS

| | | | | |
|---|---|---|---|---|
| 3,135,407 A * | 6/1964 | Back | | 414/498 |
| 3,541,598 A | 11/1970 | Dousset et al. | | |
| 4,522,550 A * | 6/1985 | Whitehouse | | 414/498 |
| 4,690,608 A * | 9/1987 | Rasmussen | | 414/529 |
| 5,620,296 A * | 4/1997 | McMahon et al. | | 414/498 |
| 5,800,114 A * | 9/1998 | Secondi | | 414/458 |
| 6,071,062 A * | 6/2000 | Warhurst et al. | | 414/498 |
| 6,155,770 A * | 12/2000 | Warhurst | | 414/498 |
| 6,217,053 B1 | 4/2001 | Forsythe et al. | | |
| 6,357,986 B1 * | 3/2002 | Sonnamaker et al. | | 414/343 |
| 6,537,015 B2 * | 3/2003 | Lim et al. | | 414/498 |
| 6,546,312 B1 | 4/2003 | Matsumoto | | |
| 7,188,843 B2 | 3/2007 | Magness | | |
| 7,811,044 B2 | 10/2010 | Warhurst | | |
| 2002/0003996 A1 * | 1/2002 | Lim et al. | | 414/498 |
| 2006/0245878 A1 * | 11/2006 | Lockamy et al. | | 414/498 |
| 2009/0261112 A1 * | 10/2009 | Kondo | | 220/629 |

* cited by examiner

*Primary Examiner* — Saul Rodriguez
*Assistant Examiner* — Emery Hassan
(74) *Attorney, Agent, or Firm* — RG Patent Consulting, LLC; Rachel Gilboy

(57) ABSTRACT

A cargo platform system which can be uncoupled from a vehicle frame and lowered to a ground surface using a self-contained jack system after the vehicle has been removed from beneath the platform. The cargo platform system may comprise a sub-frame having deck-rails for attachment to a vehicle frame, a platform having deck-rails for removably coupling to the sub-frame, and a jack system comprising a first jack, a second jack, a third jack, and a fourth jack removably attached to a left front corner, a right front corner, a left rear corner, and a right rear corner respectively. All four jacks of the jack system are in communication together such that extension and retraction of the jacks are simultaneous and electric motors atop each jack are removable for storage.

3 Claims, 5 Drawing Sheets

US 8,998,556 B2

LOAD-N-GO PLATFORM LIFT SYSTEMS

CROSS-REFERENCE TO RELATED APPLICATION

The present application is related to and claims priority from prior provisional application Ser. No. 61/435,506, filed Jan. 24, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of cargo loading and more specifically relates to load-n-go platform lift systems for use in loading and hauling cargo.

DESCRIPTION OF THE RELATED ART

Pickup beds are used extensively in modern society to transport small amounts of cargo from one location to another. The cargo bed on a pickup is able to haul a considerable amount of cargo of varying shapes, but is less than ideal when the bed interior has less than a 4 foot unobstructed surface. Smaller vehicles such as all terrain vehicles (ATV's) or objects with a wider footprint often have to be hauled on a trailer towed behind a pickup. While some auto manufacturers have manufactured various types of "flatbeds" for pickups in the past, flatbeds for vehicles of one ton weight and under are usually aftermarket. These truck-beds allow the user greater versatility in hauling cargo of various sizes and shapes because the deck is situated above the tires which increases useable deck space.

While many pickup owners own or haul smaller second vehicles such as motorcycles or all terrain vehicles, only a portion of owners also have a trailer to be able to haul them with. The largest percentage of pickup owners have to either borrow or rent a trailer when the occasion arises to haul a second vehicle. Towing and backing a trailer requires added skills that the average car driver doesn't possess, and the time required for the trailer hookup process can be considerable as well. Commercial applications may need to situate cargo and/or equipment at locations that could be very difficult if not virtually impossible to back a trailer into. Many owners choose to eliminate many of these problems by loading and securing the second vehicle in the pickup's own cargo area which may be dangerous.

There are various methods of loading heavy items including second vehicles onto a pickup such as: using a forklift; an overhead hoist; or a ramp system. When loading a smaller wheeled second vehicle such as an ATV or a motorcycle, a ramp system is most commonly used. Caution must be exercised when using a ramp system because the ramps must be rated for the weight of the second vehicle and have a method of securing the top of the ramps to the edge of the bed or tailgate. In addition, the second vehicle's own propulsion system is used to move the weight of the second vehicle up the ramp and onto the bed, which creates its own set of hazards. Other cargos that are not self-propelled, such as tool boxes, generators, air compressors, may be wheeled, but may be very difficult to load by use of readily-available ramp systems. Many fatalities, injuries, and accidents using loading ramps are reported annually. Common factors contributing to accidents using ramps are: improperly securing the ramps; movement of the first vehicle during the loading process; improper spacing of the ramps; improper rating of the ramps; reduced capacity of ramps due to damage; and ramps being too short for the height of the deck being loaded which may cause the motorcycle or other vehicle to become high-centered.

Ramps for such purposes are usually also carried by the small vehicle and take up cargo space, being long and bulky in shape. Perfect carrying and securing methods for the ramps are not always found because the shape and size of the cargo to be hauled is not always known and the ramps must be loaded onto the first vehicle after the cargo is already in position. Improvements in loading options are desirable.

Various attempts have been made to solve the above-mentioned problems such as those found in U.S. Pat. Nos. 7,811,044; 3,135,407; 6,217,053; 7,188,843; 3,541,598; and 6,546,312. This prior art is representative of loading means. None of the above inventions and patents, taken either singly or in combination, is seen to describe the invention as claimed.

Ideally, a cargo platform loading and unloading system should be safe in use, providing quick loading and unloading, and reduced labor, and yet would operate reliably and be manufactured at a modest expense. Thus, a need exists for a reliable cargo platform system to load and unload cargo and to avoid the above-mentioned problems.

BRIEF SUMMARY OF THE INVENTION

In view of the foregoing disadvantages inherent in the known cargo loading art, the present invention provides a novel cargo self-loading and hauling system. The general purpose of the present invention, which will be described subsequently in greater detail, is to provide safety and speed in loading, transporting, and unloading various equipment and cargos.

The present invention as disclosed herein is an independently liftable cargo platform that easily secures to a pickup frame and is usable as a pickup flatbed. Cargo is placed onto the deck surface and secured while the platform is at ground level, then the platform is lifted to a height that allows a pickup to be positioned beneath, and the platform secured to the pickup frame. The cargo platform system may comprise: a sub-frame having deck-rails; a platform having platform-rails; a perimeter frame having a left front corner, a right front corner, a left rear corner, and a right rear corner; a top surface and a bottom surface; and a jack system comprising a first jack, a second jack, a third jack, and a fourth jack in preferred embodiments.

The deck-rails of the sub-frame are preferably removably connected to the vehicle frame and the platform-rails are coupled to the bottom side of the platform. The perimeter frame defines an outward edge of the platform and the platform with the platform rails is removably mountable to the sub-frame. The top surface of the platform comprises a planar surface such that a cargo is upwardly supported by the planar surface and the bottom surface of the platform is supported by the platform rails. The platform may also incorporate a fixed/removable front panel (headache rack), fixed/removable platform sides, and a hinged/removable tailgate in alternate embodiments. The first jack, the second jack, the third jack, and the fourth jack of the jack system are removably mounted to the left front corner, the right front corner, the left rear corner, and the right rear corner, respectively.

The cargo platform system may be independently powered using a power feed source which may be a 110 or 220 volt alternating voltage circuit or the system may be powered from the vehicle's 12 volt system as well in alternate embodiments. The first jack, the second jack, the third jack, and the fourth jack each comprise electric motors (may be master/slave) and are in communication together such that extendable or retractable operation is simultaneous between the first jack, the second jack, the third jack, and the fourth jack in the jack system. The perimeter frame further comprises mounts for the four jacks, which are affixed to the left front corner, the right front corner, the left rear corner, and the right rear corner respectively. The jacks at the left front corner and the right front are mounted either on a telescoping/sliding mounting system or may be mounted on a pivoting bracket mounting system such that the left front jack and the right front jack can be positioned so that they will not interfere with the removal of the hauling truck from underneath the loading platform. The simultaneous operation of the jacks allows the platform to be loaded and unloaded in a substantially level condition such that the vehicle is not stressed by such operations. In this way the present invention doesn't cause the vehicle's rear end to 'squat' and the front end to be raised, but rather loads the vehicle in a balanced fashion. This promotes longevity of the host vehicle and doesn't endanger the load by tilting it at an angle.

The jacks may be slideably removable from the perimeter of the platform and each jack is cylindrical in shape with the bottom of each jack level with the bottom of the platform and the top of each jack extending upward. Each jack is about 4 feet in height when in a retracted position and is each about 7 feet in height when in an extended position. The jack system is able to lower the platform into close proximity to a ground surface such that a ramp system may not be necessary to load heavy cargo. However, some low ground clearance vehicles/cargo may require short ramps 36" or less to facilitate loading/unloading. These ramps are easily stowable between the platform and the sub-frame. A hinged tailgate may also double as a load/unload ramp. The rear edge of the platform may also be dropped or angled to form an integral ramp in the platform itself. Each jack in the system may comprise feet on the bottom surface of the extendable portion of each jack such that the jacks will not readily sink into a soft ground surface. Hard wheeled casters could be used at the bottom of the jack legs so that the platform could be rolled about on a hard surface.

The sub-frame preferably comprises mud flaps, brake lights, tail lights, turn signals, and backup lights in communication with the vehicle's operator controls and when the sub-frame is mounted onto the vehicle, the vehicle conforms to legal highway requirements without the platform mounted onto the sub-frame. The deck-rails comprise guide-locks for the platform-rails to be contact guided into a parallel planar relation to the deck-rails and the platform-rails are able to be coupled together with the guide-rails via the guide-locks using aligning orifices in the platform-rails. The sub-frame is designed such that it does not require alterations to the vehicle, and provides added strength to the vehicle's frame structure.

The top surface of the platform may comprise at least one wheel stop in certain embodiments so that a motorized second vehicle situated on the top surface of the platform is substantially prevented from contacting a rear exterior surface of a cabin of the vehicle caused by a relative motion of the second vehicle to the first vehicle. The wheel stop may hingedly rotate upwardly from a parallel planar position with the top surface of the platform to a perpendicular relationship with the top surface of the platform or may be a separate component of the cargo platform system in some embodiments. A front panel fixed or removably mountable to the front-forward portion of the platform may also be used to contain/prevent contact between the rear exterior surface of the cabin of the hauling vehicle and the cargo. The top surface of the platform comprises wooden planks in a preferred embodiment (ferrous or non-ferrous materials or the like may also be used) and the cargo platform system may be independently powered.

The electric motors of the jack system are preferably between 12 to 240 volts and may have a controller for raising or lowering the jack system. The electric motors of the jack system may be removable and storable when not in use. The cargo platform system is able to lift about 4,000 pounds (more or less) vertically to a user specified height and the cargo platform system is usable to support and lift the cargo on the platform from a ground-adjacent-position to an elevated position so that a host vehicle is able to be backed under the platform. The platform may then be lowered into contact with the sub-frame and secured for transport on the vehicle from one location to another.

A method of using a cargo platform system may comprise the steps of: uncoupling the platform from the vehicle; raising the platform for removal of the vehicle from beneath; lowering the platform to a ground surface; placing a cargo onto the platform; raising the platform using a jack system to a user defined height; backing a vehicle beneath the raised platform; lowering the platform onto the vehicle; coupling the platform to the vehicle; hauling the cargo from one location to another; uncoupling the platform from the vehicle; raising the platform for removal of the vehicle from beneath; and lowering the platform to a ground surface for cargo unloading.

Other applications for use with the present invention may include: ticket/vendor booths; complete work stations; and modular component systems. If the pickup truck came with a factory installed pickup bed or box, the bed/box once removed could be stored for later reinstallation at trade-in time, or it could be sold to help offset the cost of the Load-N-Go platform lift system.

The present invention holds significant improvements and serves as a cargo platform system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, load-n-go platform lift systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a cargo loading device and more particularly to a cargo loading and hauling system as used to improve safety, speed of loading and unloading, and to reduce labor.

Figure 1:
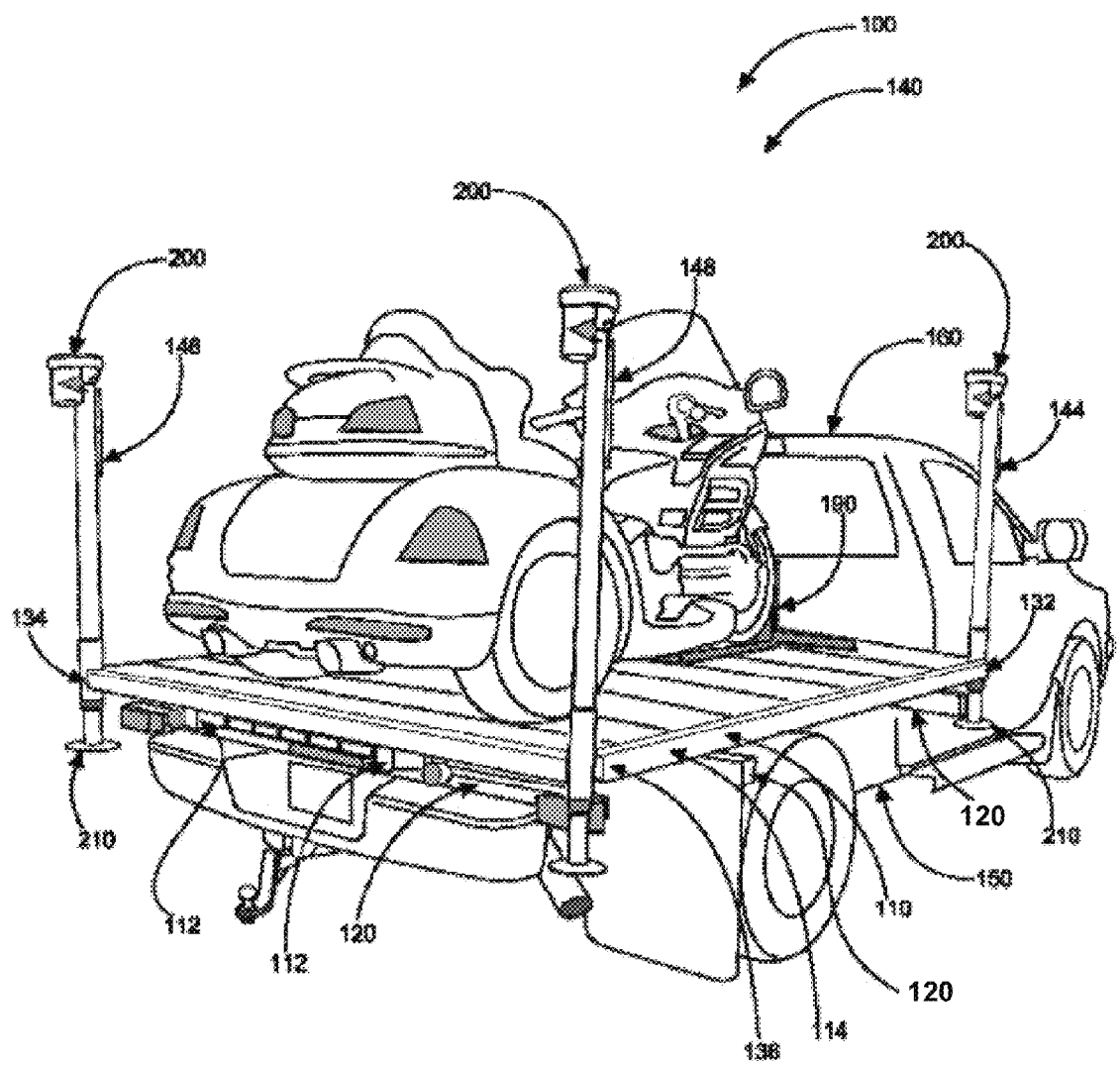
FIG. 1 shows a perspective view illustrating a cargo platform system according to an embodiment of the present invention with a type of cargo loaded and secured thereon.

Referring to the drawings by numerals of reference there is shown in FIG. 1, shows a perspective view illustrating cargo platform system 100 according to an embodiment of the present invention. Cargo platform system 100 of the present invention comprises platform 110 that is self-contained, designed to allow one person to independently pick up and transport excessively heavy (or light) loads. Cargo platform system 100 is designed to allow individuals to pick up and transport loads effectively eliminating the need for long, heavy ramps or other equipment. Cargo platform system 100 may comprise: a sub-frame 120 having deck-rails 122; platform 110 (having platform rails 112; perimeter frame 114 having left front corner 130, right front corner 132, left rear corner 134, and right rear corner 136; top surface 116; bottom surface 118); and jack system 140 having first jack 142, second jack 144, third jack 146 and fourth jack 148.

Deck-rails 122 of sub-frame 120 are removably connected to vehicle frame 150 and platform-rails 112 are coupled to bottom surface 118 of platform 110 and are removably mountable to sub-frame 120 in preferred embodiments. Perimeter frame 114 defines an outward edge of platform 110 which may have planar top surface 116 usable to upwardly support a cargo. Bottom surface 118 of platform 110 may be supported by platform-rails 112 which provide a support for strengthening platform 110 (providing rigidity) and for mounting platform 110 to sub-frame 120 for transporting.

First jack 142, second jack 144, third jack 146, and fourth jack 148 of jack system 140 are preferably (removably or non-removably) mounted to left front corner 130, right front corner 132, left rear corner 134, and right rear corner 136, respectively. First jack 142, and second jack 144 may slide/telescope, or otherwise pivot to provide clearance for the rear wheels of the hauling vehicle 160. Cargo platform system 100 may be independently powered from vehicle 160 or may use vehicle's 160 power (systems) to operate. Cargo platform system 100 is usable to support and lift cargo on platform 110 from a ground-adjacent-position to an elevated position such that vehicle 160 is able to be backed under platform 110, platform 110 is lowered into contact with sub-frame 120, and secured for transport on vehicle 160 from one location to another.

Figure 2:
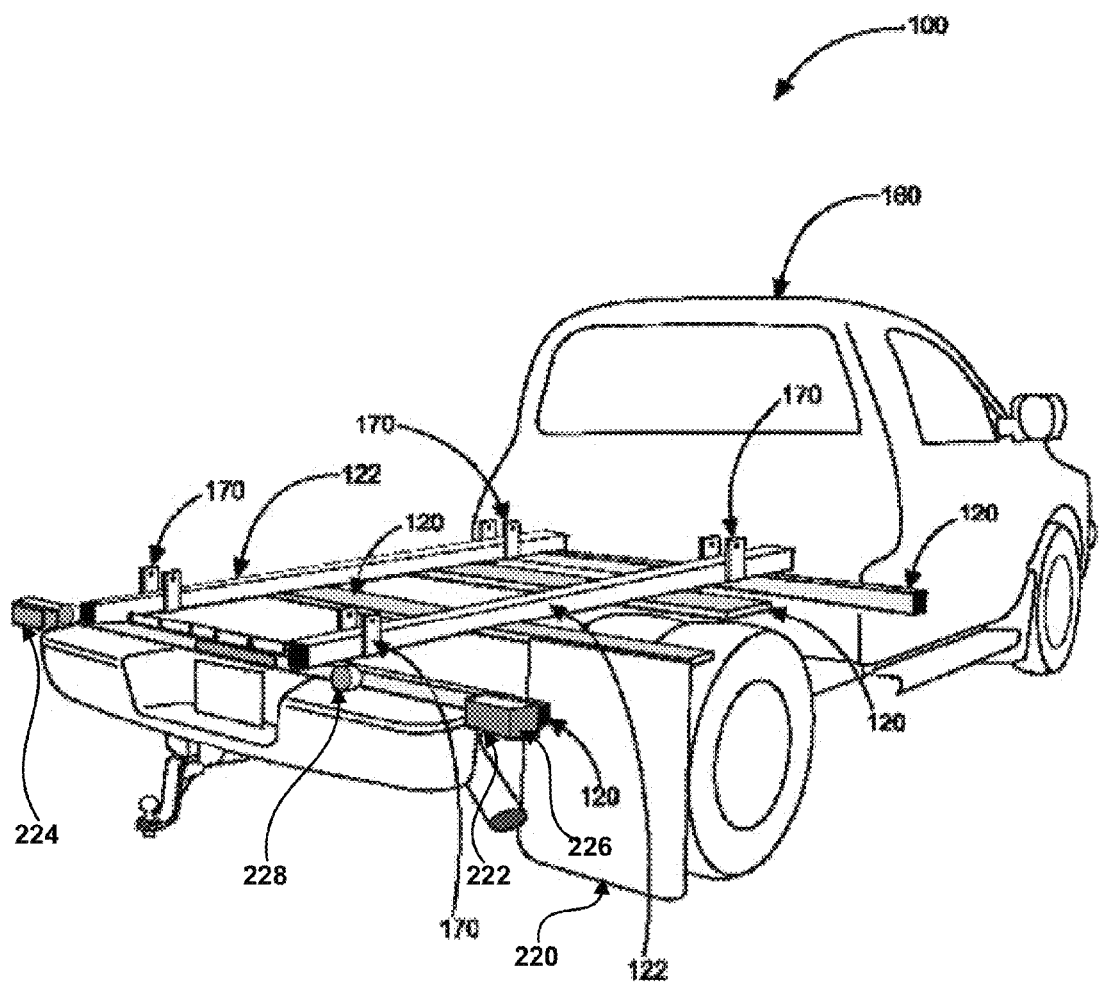
FIG. 2 is a perspective view illustrating a sub-frame of a cargo platform system according to an embodiment of the present invention of FIG. 1.

Referring now to FIG. 2, a perspective view illustrating sub-frame 120 of cargo platform system 100 according to an embodiment of the present invention of FIG. 1.

Sub-frame 120 may have mud flaps, brake lights, tail lights, turn signals, and backup lights so that vehicle 160 conforms to highway legal requirements (with or) without platform 110 mounted onto sub-frame 120. Lights mounted onto sub-frame 120 are in communication with vehicle's 160 operator controls. Deck-rails 122 preferably comprise guide-locks 170 for platform-rails 112 such that platform-rails 112 are able to be contact guided into a parallel planar relation to deck-rails 122. Deck-rails 122 and platform-rails 112 are able to be removably coupled together via guide-locks 170 and at least one matching orifice of platform-rails 112.

Figure 3:
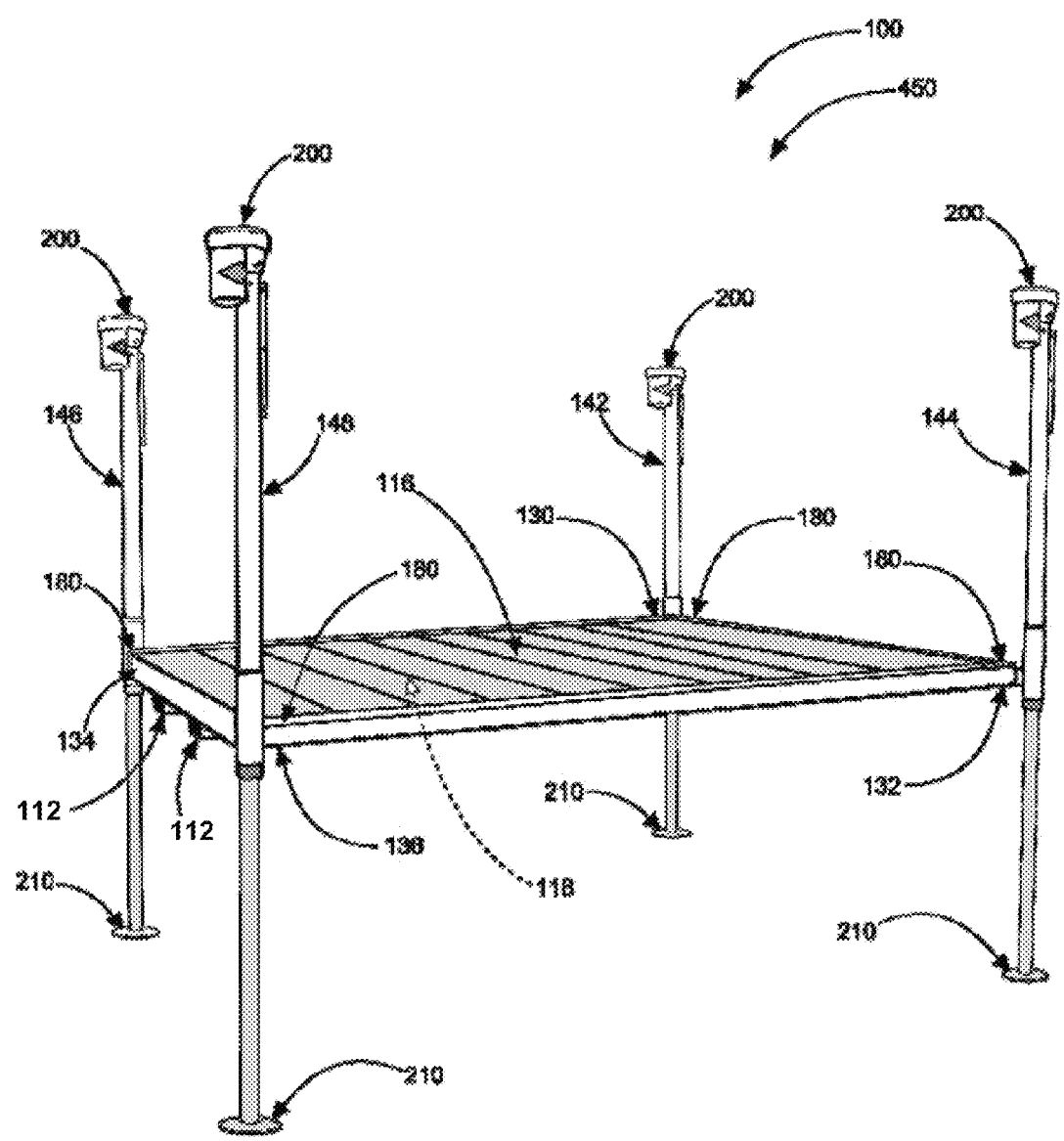
FIG. 3 is a perspective view illustrating a platform of a cargo platform system according to an embodiment of the present invention of FIG. 1.

Referring now to FIG. 3, a perspective view illustrating platform 110 of cargo platform system 100 according to an embodiment of the present invention of FIG. 1.

Perimeter frame 114 further comprises mounts for first jack 142, second jack 144, third jack 146, and fourth jack 148 which are affixed to left front corner 130, right front corner 132, left rear corner 134, and right rear corner 136 respectively, as described previously. First jack 142, second jack 144, third jack 146, and fourth jack 148 may be slideably removable from mounts 180 on perimeter of platform 110 in certain embodiments.

Top surface 116 of platform 110 may comprise at least one wheel stop 190 as shown in FIG. 1 such that a cargo such as a second motorized vehicle situated on top surface 116 of platform 110 is prevented from contacting a rear exterior surface of cabin of vehicle 199 caused by a relative motion of second motorized vehicle in relation to platform 110 on vehicle 160. Wheel stop 190 is hingedly rotatable upwardly from a nested position to a perpendicular relationship with top surface 116 of platform 110 such that a front wheel of second motorized vehicle may be substantially prevented from forward movement. A front panel fixed or removably mountable to the front-forward portion of platform 110 may also be used to contain/prevent contact between the rear exterior surface of the cabin of the hauling vehicle 160 and the cargo. Top surface 116 of platform 110 may comprise wooden planks in a preferred embodiment but may be plate steel or aluminum in other embodiments. Cargo platform system 100 is independently powered via a controller in communication with a powerer and powerer may be an alternating current source or via a vehicle 160 powered source.

Figure 4:
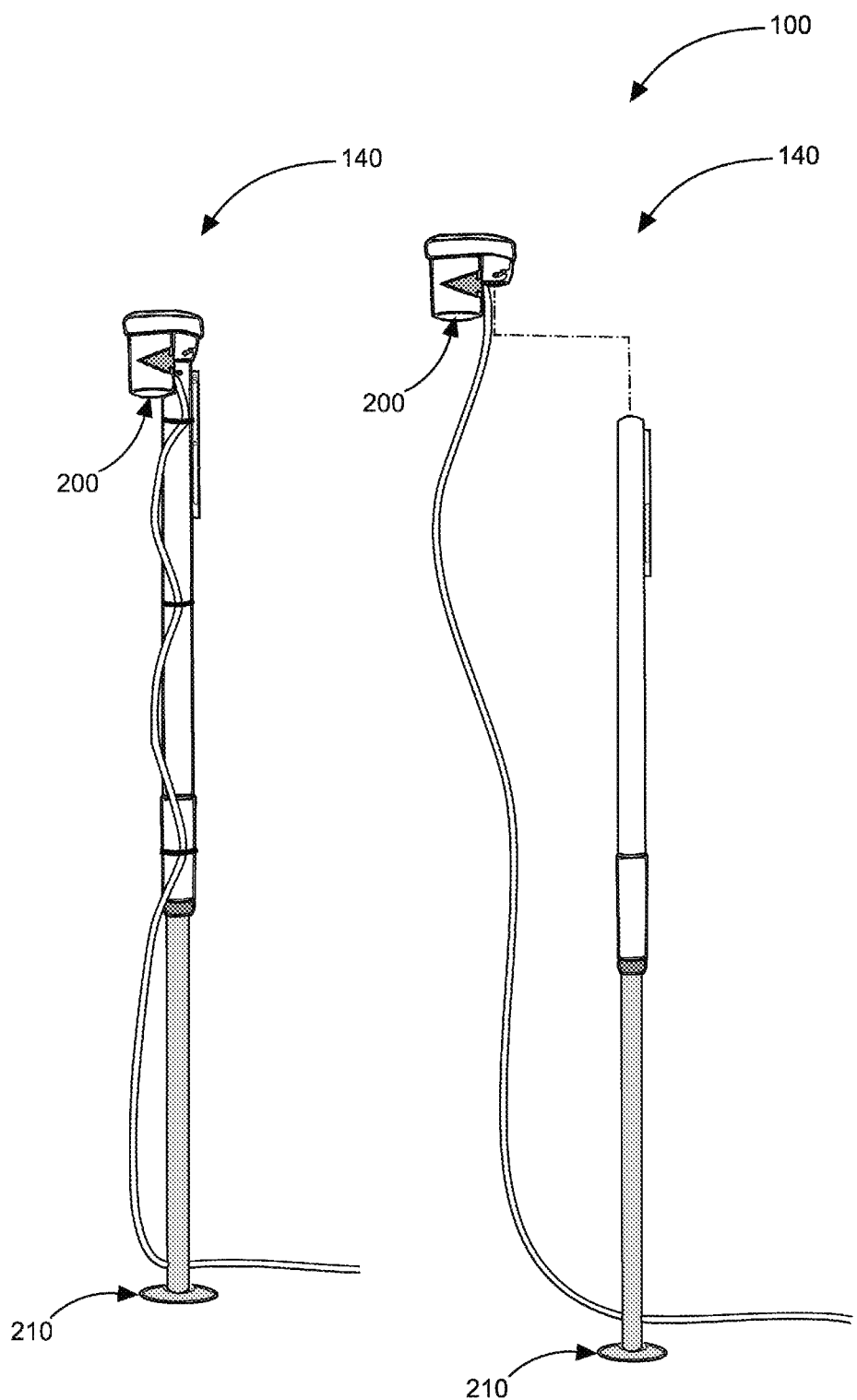
FIG. 4 is a perspective view illustrating a jack system of a cargo platform system according to an embodiment of the present invention of FIG. 1.

Referring now to FIG. 4, a perspective view illustrating jack system 140 of cargo platform system 100 according to an embodiment of the present invention of FIG. 1.

Jack system 140 having first jack 142, second jack 144, third jack 146, and fourth jack 148 each comprising electric motors 200 which are in communication together such that extendable or retractable operations are simultaneous. First jack 142, second jack 144, third jack 146, and fourth jack 148 each comprise cylindrical profiles and are each about 4 feet in height when in a retracted position and about 7 feet in height when in an extended position. First jack 142, second jack 144, third jack 146, and fourth jack 148 also may comprise feet 210 on a bottom surface of an extendable portion such that they will not sink into a soft ground surface. Jack system 140 is able to lower platform 110 into close proximity to a ground surface such that a ramp system may not be necessary to load a heavy cargo. However, some low ground clearance vehicles/cargo may require short ramps 36" or less to facilitate loading/unloading. These ramps are easily stowable between platform 110 and the sub-frame. A hinged tailgate may also double as a load/unload ramp. The rear edge of platform 110 may also be dropped or angled to form an integral ramp in the surface of platform 110 itself. Electric motors 200 of jack system 140 are between 12 to 240 volts and may be powered from a non-vehicle or vehicle 160 source. Electric motors 200 of jack system 140 also may have a remote controller for raising or lowering jack system 140. Electric motors 200 of jack system 140 may be removable and storable when not in use. Cargo platform system 100 is able to lift about 4,000 pounds vertically to a user defined height.

Cargo platform system 100 according to an embodiment of the present invention of FIGS. 1-4, may be sold as kit 450 comprising the following parts: at least one sub-frame 120 comprising deck-rails 122; at least one platform 110; at least one jack system 140 comprising; first jack 142, second jack 144, third jack 146, and fourth jack 148; at least one controller; and at least one set of user instructions. Cargo platform system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different jack combinations and capacities, parts may be sold separately, etc., may be sufficient.

Figure 5:
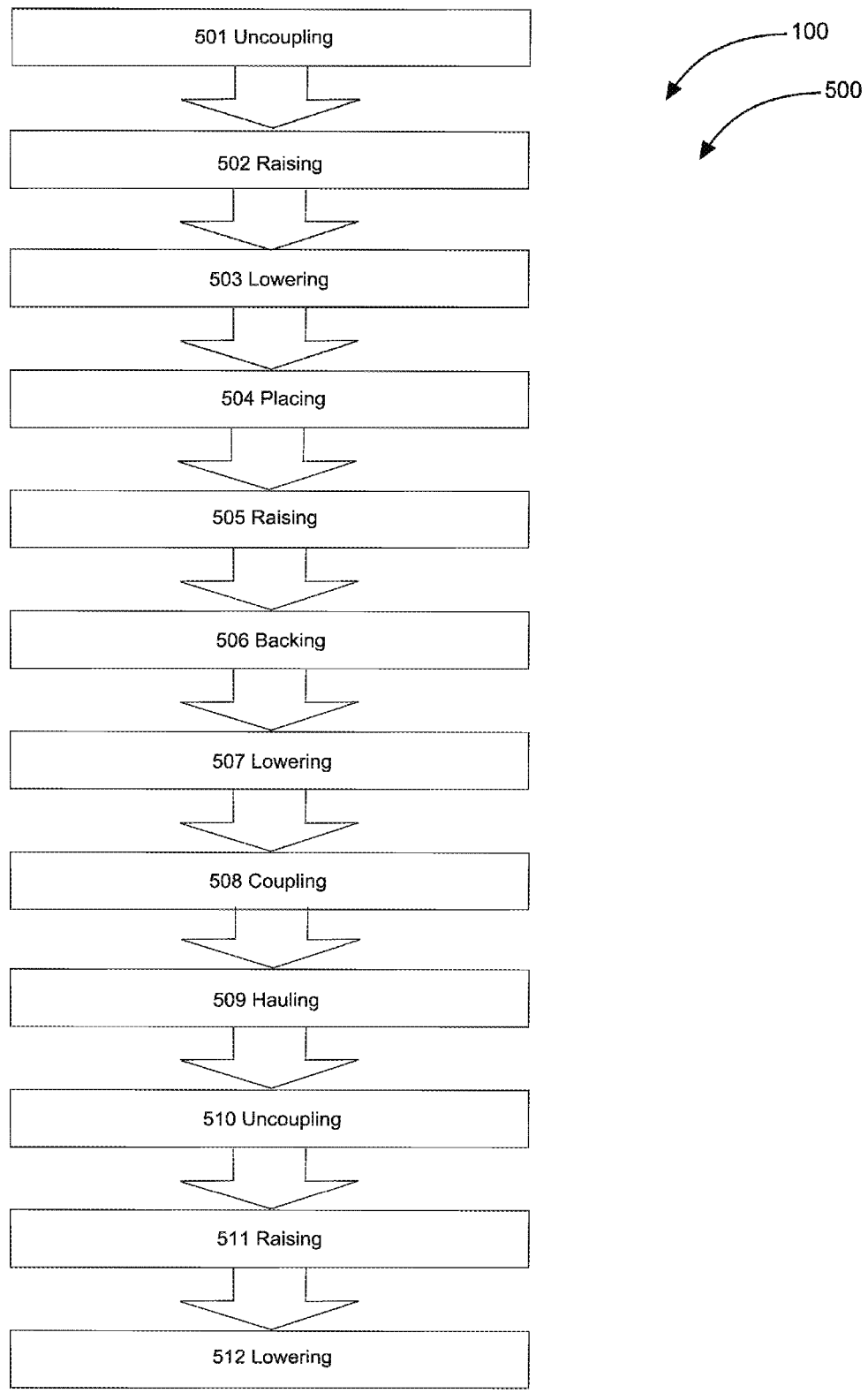
FIG. 5 is a flowchart illustrating a method of use for a cargo platform system according to an embodiment of the present invention of FIGS. 1-4.

Referring now to FIG. 5, showing a flowchart illustrating a method of use 500 for cargo platform system 100 according to an embodiment of the present invention of FIGS. 1-4.

Method of use 500 for cargo platform system 100 may comprise the steps of: step one 501 uncoupling platform 110 from vehicle 160; step two 502 raising platform 110 for removal of vehicle 160 from beneath platform 110; step three 503 lowering platform 110 to a ground surface; step four 504 placing a cargo onto platform 110; step five 505 raising platform 110 using jack system 140 to a user defined height; step six 506 backing vehicle 160 beneath raised platform 110; step seven 507 lowering platform 110 onto vehicle 160; step eight 508 coupling platform 110 to vehicle 160; step nine 509 hauling cargo from one location to another; step ten 510 uncoupling platform 110 from vehicle 160; step eleven 511 raising platform 110 for removal of vehicle 16 from beneath; and step twelve 512 lowering platform 110 to a ground surface for cargo unloading. Cargo may also be loaded/unloaded from a dock or loading platform, or even transferred from another vehicle's loading/hauling platform or loading/hauling surface.

It should be noted that step 501 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A cargo platform system comprising:
   a) a sub-frame comprising deck-rails;
   b) a platform having;
      i) platform-rails;
      ii) a perimeter frame having a left front corner, a right front corner, a left rear
      iii) corner, and a right rear corner;
      iv) a top surface; and
      v) a bottom surface; and
   c) a jack system comprising;
      i) a first jack;
      ii) a second jack;
      iii) a third jack; and
      iv) a fourth jack;
   d) wherein said deck-rails of said sub-frame are removably connected to a vehicle frame;
   e) wherein said platform-rails are coupled to said bottom surface of said platform;
   f) wherein said perimeter frame defines an outward edge of said platform;
   g) wherein said platform with said platform rails is removably mountable to said sub-frame;
   h) wherein said top surface of said platform comprises a planar surface structured and arranged with said top surface such that a cargo is upwardly supported by said planar surface;
   i) wherein said bottom surface of said platform is supported by said platform rails;
   j) wherein said first jack, said second jack, said third jack, and said fourth jack of said jack system are removably mounted to said left front corner, said right front corner, said left rear corner, and said right rear corner, respectively;
   k) wherein said cargo platform system is independently powered;
   l) wherein said jack system having said first jack, said second jack, third jack, and said fourth jack comprises electric motors that are structured and arranged to be in communication together and further structured and arranged such that extendable and retractable operation is simultaneous among all of said first jack, said second jack, third jack, and said fourth jacks in said jack system;
   m) wherein said perimeter frame further comprises mounts for said first jack, said second jack, said third jack, and said fourth jack which are affixed to said left front corner, said right front corner, said left rear corner, and said right rear corner respectively;
   n) wherein said first jack, said second jack, third jack, and said fourth jack are slideably removable from said perimeter of said platform;

o) wherein said first jack, said second jack, said third jack, and said fourth jack are cylindrical and each about 4 feet in height when in said retracted position;
p) wherein said first jack, said second jack, said third jack, and said fourth jack are each about 7 feet in height when in an extended position;
q) wherein said jack system is structured and arranged to lower said platform into close proximity to a ground surface and further structured and arranged such that a ramp system is not needed to load said cargo;
r) wherein said first jack, said second jack, third jack, and said fourth jack comprise feet on said bottom surface of an extendable portion of each jack such that said first jack, said second jack, third jack, and said fourth jack are structured and arranged to not sink into a soft ground surface;
s) wherein said sub-frame comprises mud flaps, brake lights, tail lights, turn signals, and backup lights in communication with said vehicle's operator controls structured and arranged with said vehicle's operator controls such that when said sub-frame is mounted onto said vehicle, said vehicle conforms to vehicle street-legal requirements without said platform mounted onto said sub-frame;
t) wherein said deck-rails comprise guide-locks that are structured and arranged for accommodating said platform-rails and further structured and arranged such that said platform-rails are contact guided into a parallel planar relation to said deck-rails, and wherein said deck-rails and said platform-rails are further structured and arranged with said guide-locks to couple together with said guide-locks and with at least one orifice of said platform-rails;
u) wherein said top surface of said platform comprises at least one wheel stop structured and arranged such that when said cargo is situated on said top surface of said platform it is substantially prevented from contacting a rear exterior surface of a cabin of said vehicle caused by a relative motion of said vehicle;
v) wherein said at least one wheel stop is structured and arranged to hingedly rotate upward from a parallel planar position relative to said top surface of said platform and further structured and arranged to establish a perpendicular relationship with said top surface of said platform;
w) wherein said top surface of said platform comprises wooden planks;
x) wherein said cargo platform system is independently powered;
y) wherein said electric motors of said jack system are between 12 to 240 volts;
z) wherein said electric motors of said jack system comprise a controller for raising or lowering said jack system;
aa) wherein said electric motors of said jack system are structured and arranged for removing and storing when not in use;
bb) wherein said cargo platform system is structured and arranged to lift about 4,000 pounds vertically to a user specified height; and
cc) wherein said cargo platform system is structured and arranged to support and lift said cargo on to said platform from a ground-adjacent-position to an elevated position in a substantially level condition and further structured and arranged such that said vehicle can be backed under said platform, said platform is structured and arranged to be lowered into contact with said sub-frame and is further structured and arranged to be secured for transport on said vehicle from one location to another.

2. The cargo platform system of claim 1 comprising a kit having:
a) said sub-frame comprising said deck-rails;
b) said platform;
c) said jack system comprising;
  i) said first jack;
  ii) said second jack;
  iii) said third jack; and
  iv) said fourth jack;
d) said controller; and
e) a set of user instructions.

3. A method of using the cargo platform system of claim 1 comprising the steps of:
a) uncoupling platform from vehicle;
b) raising said platform for removal of said vehicle from beneath said platform;
c) lowering said platform to a ground surface;
d) placing a cargo onto said platform;
e) raising said platform using a jack system to a user defined height;
f) backing said vehicle beneath raised said platform;
g) lowering said platform onto said vehicle;
h) coupling said platform to said vehicle;
i) hauling said cargo from one location to another;
j) uncoupling said platform from said vehicle;
k) raising said platform for removal of said vehicle from beneath; and
l) lowering said platform to said ground surface for unloading said cargo.

* * * * *